(12) United States Patent
Denis et al.

(10) Patent No.: US 9,453,413 B2
(45) Date of Patent: *Sep. 27, 2016

(54) ROTOR WITH IMPROVED BALANCING FEATURES

(71) Applicant: Pratt & Whitney Canada Corp., Longueuil (CA)

(72) Inventors: David Denis, Burlington (CA); Amir Maria, Cambridge, MA (US)

(73) Assignee: PRATT & WHITNEY CANADA CORP., Longueuil (CA)

( * ) Notice: Subject to any disclaimer, the term of this patent is extended or adjusted under 35 U.S.C. 154(b) by 658 days.

This patent is subject to a terminal disclaimer.

(21) Appl. No.: 13/675,276

(22) Filed: Nov. 13, 2012

(65) Prior Publication Data
US 2013/0071245 A1 Mar. 21, 2013

Related U.S. Application Data

(62) Division of application No. 12/236,717, filed on Sep. 24, 2008, now Pat. No. 8,328,519.

(51) Int. Cl.
| *F01D 5/10* | (2006.01) |
| *F01D 5/02* | (2006.01) |
| *F04D 29/66* | (2006.01) |
| *G01M 1/32* | (2006.01) |
| *B23P 15/00* | (2006.01) |

(52) U.S. Cl.
CPC ............ *F01D 5/027* (2013.01); *B23P 15/006* (2013.01); *F01D 5/10* (2013.01); *F04D 29/662* (2013.01); *G01M 1/32* (2013.01); *F05B 2260/966* (2013.01); *F05D 2260/96* (2013.01); *Y10T 29/49234* (2015.01); *Y10T 29/49316* (2015.01)

(58) Field of Classification Search
CPC ............ F01D 5/027; F01D 5/10; F01D 5/26; F01D 25/04; F01D 25/06; F04D 29/662; F16F 15/32; G01M 1/36; F05B 2260/96; F05B 2260/966; F05D 2260/96
USPC ........... 416/144, 73, 66, 455, 460, 468, 470, 416/145, 500, 1, 139, 162; 73/66, 455, 460, 73/468, 470; 29/889, 889.1
See application file for complete search history.

(56) References Cited

U.S. PATENT DOCUMENTS

| 1,360,936 | A | | 11/1920 | Guy |
| 1,970,435 | A | | 8/1934 | Sharp |
| 4,097,192 | A | | 6/1978 | Kulina |
| 4,477,226 | A | | 10/1984 | Carreno |
| 4,817,455 | A | | 4/1989 | Buxe |
| 4,836,755 | A | | 6/1989 | Nitsche et al. |
| 4,879,792 | A | * | 11/1989 | O'Connor ....................... 29/889 |
| 4,926,710 | A | | 5/1990 | Novotny |
| 5,018,943 | A | | 5/1991 | Corsmeier et al. |
| 5,871,314 | A | | 2/1999 | Trionfetti |
| 6,354,780 | B1 | | 3/2002 | Davis et al. |

(Continued)

*Primary Examiner* — Christopher Verdier
(74) *Attorney, Agent, or Firm* — Norton Rose Fulbright Canada LLP

(57) ABSTRACT

A rotor assembly for a gas turbine engine including a circumferential array of regularly spaced apart features provided on the disk which are each configured for receiving a balancing weight. The circumferential array of features has an angular orientation relative to the circumferential array of blades such that the features are each located at an at least substantially same offset angle from a stacking line of a respective adjacent blade.

10 Claims, 3 Drawing Sheets

(56) References Cited

U.S. PATENT DOCUMENTS

| | | |
|---|---|---|
| 6,976,826 B2 | 12/2005 | Roy et al. |
| 7,033,131 B2 | 4/2006 | Schreiber |
| 7,069,654 B2 * | 7/2006 | Robbins ................... 29/889.23 |
| RE39,630 E | 5/2007 | Stangeland et al. |
| 7,210,226 B2 | 5/2007 | Makinson et al. |
| 7,305,762 B2 | 12/2007 | Mola |
| 8,328,519 B2 * | 12/2012 | Denis ..................... F01D 5/027 29/889 |
| 2005/0191181 A1 | 9/2005 | Bertrand et al. |
| 2007/0253820 A1 * | 11/2007 | Liu ....................... F04D 29/662 416/144 |
| 2008/0260535 A1 | 10/2008 | Mohr et al. |

* cited by examiner

ROTOR WITH IMPROVED BALANCING FEATURES

RELATED APPLICATIONS

This application is a divisional of U.S. Pat. No. 8,328,519 issued on Dec. 11, 2012, the content of which is hereby incorporated by reference.

TECHNICAL FIELD

The application relates generally to rotors for gas turbine engines and, more particularly, to improved balancing features for such rotors.

BACKGROUND OF THE ART

It is routine for gas turbine engines to have to pass stringent vibration acceptance tests following production. Rotor eccentricities are a main source of engine vibration, and eccentricities can be alleviated by rotor balancing. Examples of how rotors are balanced without compromising their structural integrity include oversizing a part of the rotor disk then removing material in selected portions of that part, and providing an additional removable ring from which material is removed in selected portions thereof. However these approaches generally increase the weight of the rotor.

SUMMARY

In one aspect, there is provided a rotor assembly for a gas turbine engine, the rotor assembly comprising a disk, a circumferential array of regularly spaced apart blades extending from the disk, a circumferential array of regularly spaced apart features provided on the disk and at least one balancing weight, each of the features being configured for receiving one of the at least one balancing weight, the circumferential array of features having an angular orientation relative to the circumferential array of blades such that all the features are each located at an at least substantially same offset angle from a stacking line of a respective adjacent one of the blades.

In another aspect, there is provided a method of locating features on a rotor assembly of a gas turbine engine, the rotor including a rotor disk and a circumferential array of regularly spaced apart blades extending from the disk, the features being configured to receive at least one balancing weight, the method comprising determining a quantity of the features to be provided on the rotor corresponding to a quantity of the blades extending from the disk, determining an offset angle for the features with respect to the circumferential array of blades based on a leading edge stress of the blades, and providing the features on the disk in a regularly circumferentially spaced manner such that each of the features is at least substantially located at the offset angle from a respective adjacent one of the blades.

In a further aspect, there is provided a method of locating features configured to receive a balancing weight in a rotor of a gas turbine engine, the rotor including a disk supporting a plurality of blades, the method comprising selecting an angular position on the disk where a stress concentration caused by one of the features is minimal, the angular position being located at an offset angle from a stacking line of an adjacent one of the blades, and providing each of the features on the disk at the offset angle from the stacking line of a respective one of the blades.

DESCRIPTION OF THE DRAWINGS

Reference is now made to the accompanying figures in which.

DETAILED DESCRIPTION

Figure 1:
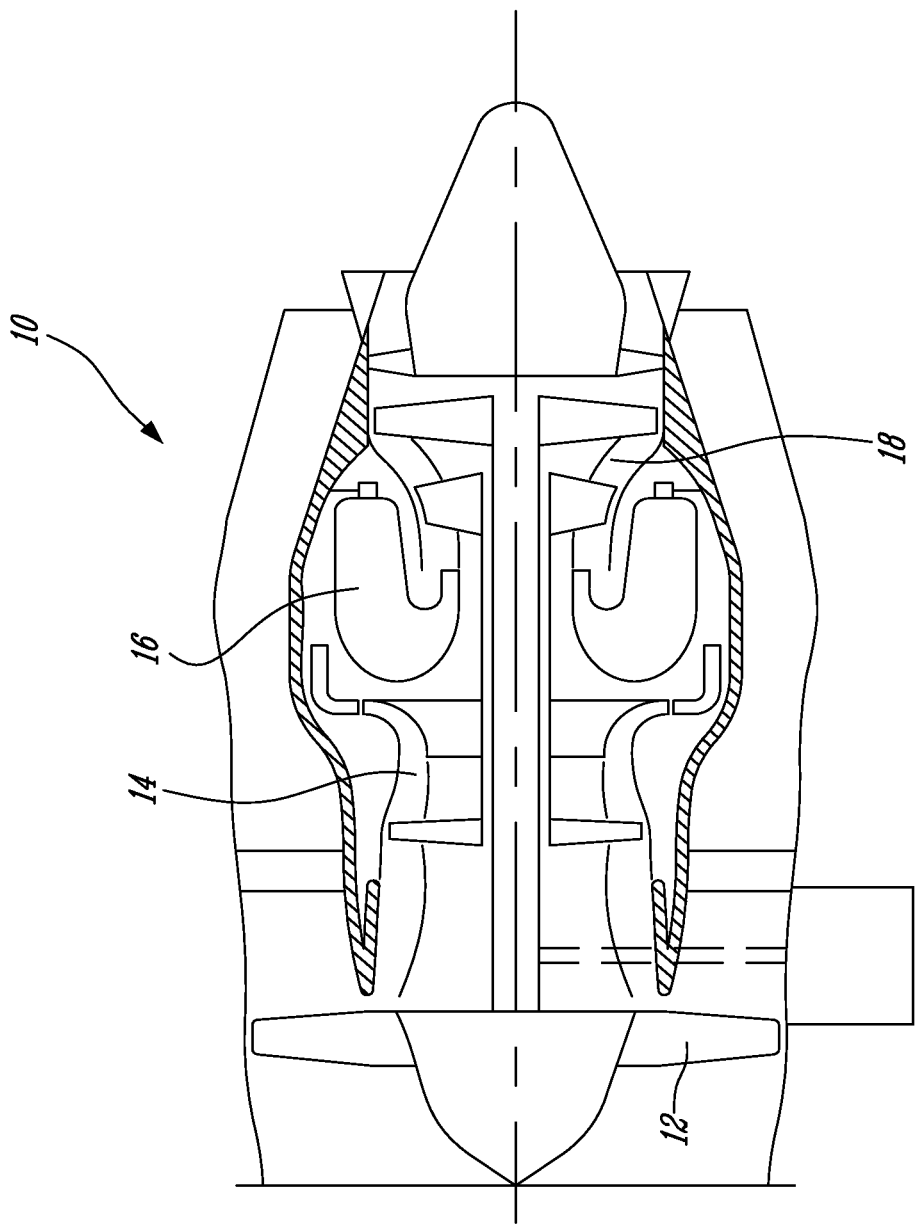
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases.

Figure 3:
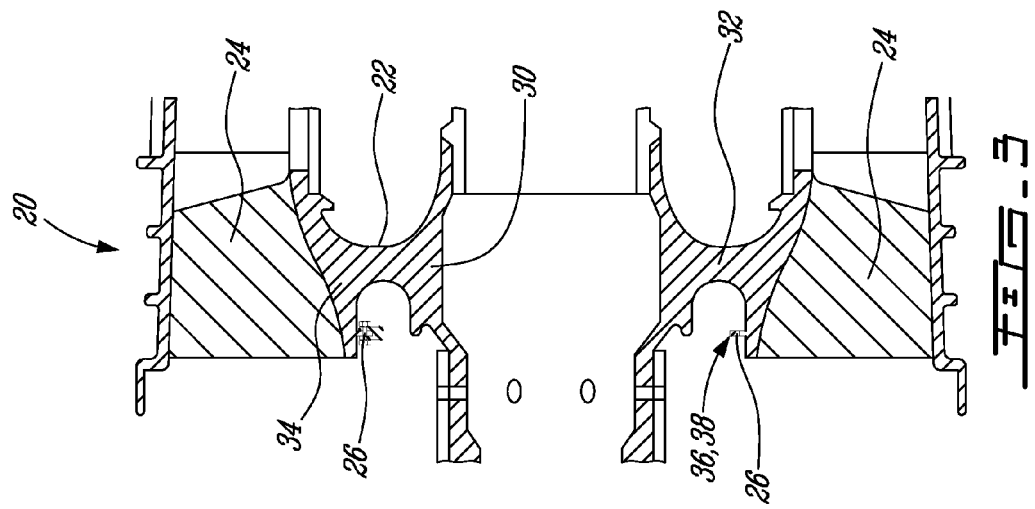
FIG. 3 is a schematic cross-sectional view of the rotor of FIG. 2.
Figure 2:
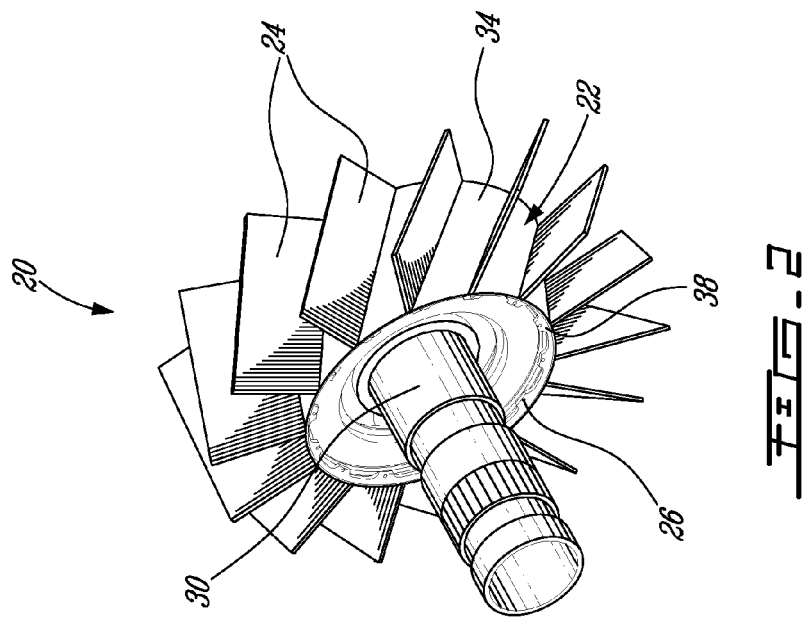
FIG. 2 is schematic perspective view of a rotor which can be used in a gas turbine engine such as shown in FIG. 1.
Figure 4:
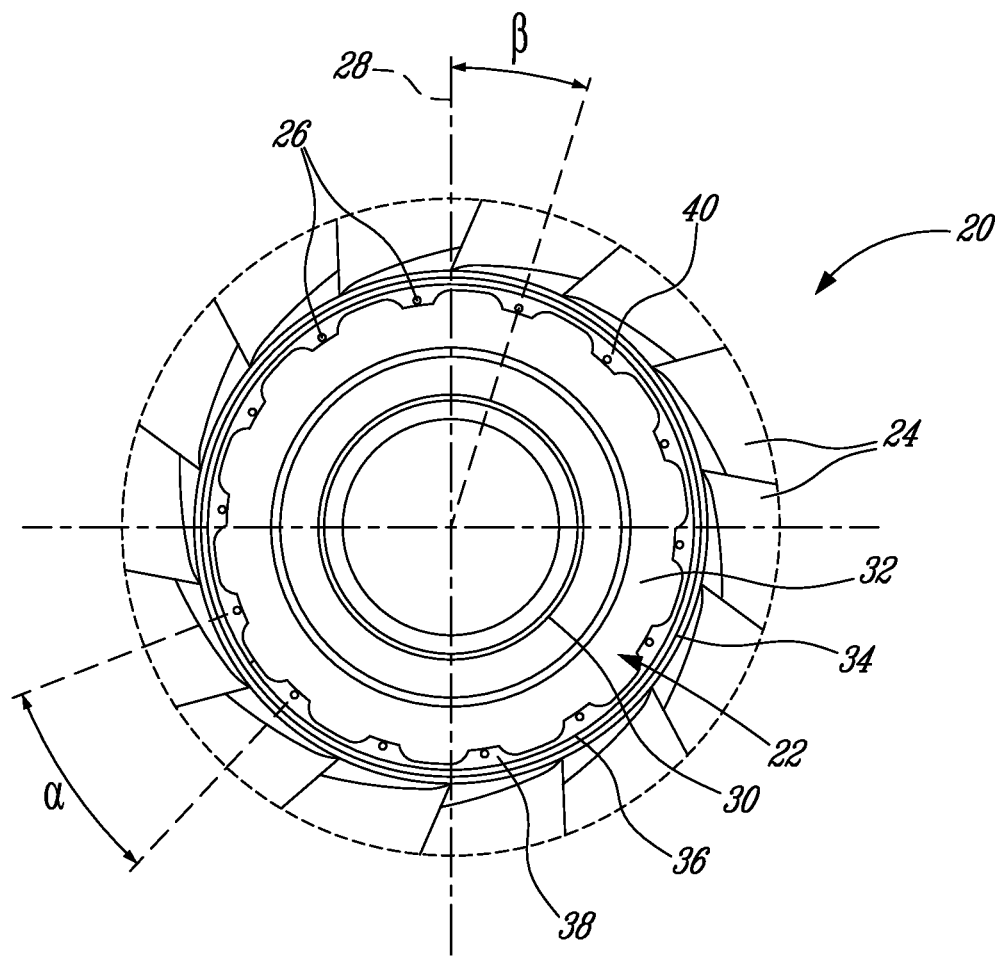
FIG. 4 is a partial schematic front view of the rotor of FIG. 2.

Referring to FIGS. 2-4, a rotor 20 which can be used in the gas turbine engine 10 of FIG. 1 or in any other adequate type of gas turbine engine is shown. In the embodiment shown, the rotor 20 is a first stage of a high pressure compressor of the compressor section 14. However, it is understood that the rotor 20 can be any other rotor of the gas turbine engine, including a turbine rotor.

The rotor 20 includes a disk 22 which supports a circumferential array of regularly spaced apart blades 24. In the embodiment shown, the rotor 20 includes fourteen (14) blades 24, although any other adequate number of blades can be used. The rotor disk 22 and blades 24 may be, but are not necessarily, integrally molded.

The disk 22 includes a hub 30 for engaging a central shaft, a radial member 32 extending radially from the hub 30, and a platform 34 supported by the radial member 32 from which the blades 24 extend radially outwardly. A flange 36 extends radially inwardly from the platform 34 opposite of the blades 24. The flange 36 includes fingers 38 extending radially inwardly further than a remainder of the flange 36.

The rotor 20 includes weight saving and/or balancing features 26. In the embodiment shown in FIG. 4, the number of features 26 is the same as the number of blades 24. The features 26 are regularly circumferentially spaced apart and thus are located at a same angle α from one another. As the number of features 26 corresponds to the number of blades 24, the angle α between adjacent features 26 is equal to the angle defined between adjacent blades 24. Each feature 26 is located at a same angle β from the stacking line 28 of a respective adjacent blade 24. The angle β or the relative angular disposition of the circumferential array of features 26 relative to the circumferential array of blades 24 may be selected or fixed such as to minimize stress concentrations and, thus, increase the service life of the rotor.

On each finger 38 is defined a location for one of the weight saving and/or balancing features 26. The number of fingers 38 is thus also equal to the number of blades 24, and each finger 38 is located between the stacking lines 28 of adjacent ones of the blades 24. In the embodiment shown, the location of each feature 26 is defined along the central radially-extending axis 40 of the corresponding finger 38.

As the illustrated rotor 20 includes fourteen (14) blades 24 and fourteen (14) features 26, the angle defined between the stacking lines 28 of adjacent blades 24, which corresponds to the angle α between adjacent features 26, is approximately 25° 42'51". In the embodiment shown, the angle β defined between each feature 26 and the stacking line 28 of the adjacent blade 24, or the relative angular disposition of the circumferential array of features 26 relative to the circumferential array of blades 24, is approximately 17° 21'36". The angle β is selected based on the geometry of the rotor 20 such as to minimize the stress induced due to the feature 26 with respect to the leading edge stress of the adjacent blade 24. In a particular embodiment, the tolerance for β is 0.01".

In a particular embodiment, the features 26 are balancing features, and each correspond to a portion of the disk 22 where material has been removed either directly for balancing purposes, or to create a shape for receiving and engaging a balancing weight. In the case where the features 26 are configured to receive a balancing weight, all the features 26 on the disk 22 may be identical. A balancing feature corresponding to a portion of the disk 22 where material has been removed can be for example a portion of the finger 38 including a notch, an opening, a section of reduced thickness, an axially extending scallop in the disk 22, etc. In a case where balancing weights are used, a single one of the features can receive one or more balancing weights, some of the features can receive one or more balancing weights, or all of the features can receive one or more balancing weights. The size and configuration of each balancing feature, including the weight of any corresponding balancing weight, is selected such as to improve balancing of the rotor 20, this selection being made following any appropriate type of balancing technique/procedure.

When a feature 26 includes a portion of the finger 38 or of any other adequate part of the disk 22 where material has been removed for balancing purposes, the feature 26 advantageously additionally reduces the weight of the disk 22 and as such plays the double role of weight saving feature and balancing feature.

The above-described configuration allows for the stress concentrations caused on the disk 22 by such the features 26 to be minimized. In a particular embodiment, the disk 22 is made of a nickel-based superalloy, such as for example Waspaloy® or IN100, which offer higher temperature alternatives to other materials more typically used in the fabrication of rotors, such as for example Titanium. Thus, the above-described configuration reducing the stress concentrations caused by the features 26 allows for materials which are more temperature-resistant but generally also more susceptible to crack initiating at stress concentrations, such as nickel superalloys or any other material having similar properties, to be used in the disk 22.

The above description is meant to be exemplary only, and one skilled in the art will recognize that changes may be made to the embodiments described without departing from the scope of the invention disclosed. For example, other types of weight saving/balancing features not specifically described herein can be used, and be provided on the disk in alternate adequate locations other than the flange and finger disposition described and shown. The above-described configuration for the weight saving and/or balancing features can be applied to any other adequate type of rotors, particularly for gas turbine engines although not limited to the type of gas turbine engine shown and described. Still other modifications which fall within the scope of the present invention will be apparent to those skilled in the art, in light of a review of this disclosure, and such modifications are intended to fall within the appended claims.

The invention claimed is:

1. A rotor assembly for a gas turbine engine, the rotor assembly comprising a disk, a circumferential array of regularly spaced apart blades extending from the disk, a circumferential array of regularly spaced apart features provided on the disk and at least one balancing weight, each of the features being configured for receiving one of the at least one balancing weight, the circumferential array of features having an angular orientation relative to the circumferential array of blades such that all the features are each located at an at least substantially same offset angle from a stacking line of a respective adjacent one of the blades, the offset angle corresponding to an angular position on the disk where a stress concentration caused by one of the features is minimal.

2. The rotor assembly as defined in claim 1, wherein the features extend axially relative to the disk and are scallop shaped.

3. The rotor assembly as defined in claim 1, wherein the disk includes a hub, a radial member extending radially from the hub and connected to a platform supporting the blades, and a flange extending radially inwardly from the platform spaced apart from the radial member, each of the features being located on the flange.

4. The rotor assembly as defined in claim 1, wherein the at least one balancing weight includes a plurality of balancing weights, the balancing weights being all engaged to a respective one of the features.

5. A method of locating features on a rotor assembly of a gas turbine engine, the rotor including a rotor disk and a circumferential array of regularly spaced apart blades extending from the disk, the features being configured to receive at least one balancing weight, the method comprising:
    determining a quantity of the features to be provided on the rotor corresponding to a quantity of the blades extending from the disk;
    determining an offset angle for the features with respect to the circumferential array of blades based on a leading edge stress of the blades, including selecting the offset angle to position the features in a circumferential location where the stress concentration induced to the features is minimal relative to the leading edge stress of the blades; and
    providing the features on the disk in a regularly circumferentially spaced manner such that each of the features is at least substantially located at the offset angle from a respective adjacent one of the blades.

6. The method as defined in claim 5, wherein providing the features on the disk includes removing material from the disk to define each of the features.

7. The method as defined in claim 6, wherein removing material from the disk includes forming a scallop on the disk for each of the features.

8. The method as defined in claim 5, further including engaging a balancing weight with at least one of the features such as to improve balancing of the rotor.

9. The method as defined in claim 5, wherein determining the offset angle is performed such that the offset angle provides for a position of the features which minimizes stress concentrations created on the disk by the features.

10. The method as defined in claim 5, wherein providing the features is performed so that the features are identical to one another.

* * * * *